United States Patent [19]

Josis et al.

[11] 4,396,463
[45] Aug. 2, 1983

[54] METHOD OF PURIFYING WASTE WATER

[75] Inventors: Christian Josis, Gembloux; Andre Hans, Waremme; Theophile Martens, Ertvelde, all of Belgium

[73] Assignee: Centre de Researches Metallurgiques-Centrum voor Research in de Metallurgies, Brussels, Belgium

[21] Appl. No.: 242,260

[22] Filed: Mar. 10, 1981

Related U.S. Application Data

[63] Continuation of Ser. No. 81,699, Oct. 4, 1979, abandoned.

[30] Foreign Application Priority Data

Oct. 4, 1978 [LU] Luxembourg .................. 80327

[51] Int. Cl.$^3$ .............................................. C02F 1/04
[52] U.S. Cl. ........................................ 203/10; 203/36; 203/96; 203/98; 203/158; 203/750; 203/356
[58] Field of Search .................... 203/10, 33, 36, 37, 203/97, 96, 98, 99, DIG. 19; 423/357, 356; 202/158, 234; 210/718, 750

[56] References Cited

U.S. PATENT DOCUMENTS

| | | | |
|---|---|---|---|
| 1,928,510 | 9/1933 | Sperr | 203/36 |
| 2,088,817 | 8/1937 | Shoeld | 203/36 |
| 2,581,881 | 1/1952 | Pyle et al. | 202/158 |
| 2,635,073 | 4/1953 | McIntire et al. | 203/36 |
| 2,767,967 | 10/1956 | Hutchinson | 202/158 |
| 3,278,423 | 10/1966 | Millar | 203/36 |
| 4,104,131 | 8/1978 | Didycz et al. | 203/36 |
| 4,108,735 | 8/1978 | Burcaw et al. | 203/36 |
| 4,160,725 | 7/1979 | Josis et al. | 210/750 |

Primary Examiner—Wilbur L. Bascomb, Jr.
Attorney, Agent, or Firm—Holman & Stern

[57] ABSTRACT

A method of purifying waste water, for example waste water from a coking plant, comprises supplying waste water to be purified to the upper part of a stripping column comprising a plurality of substantially horizontal plates disposed above one another, supplying vapor to the lower part of the column, and supplying a strong base to the column laterally at one or more levels, wherein the water to be stripped is passed downwardly from the top of the column across a number of successive plates sufficient to permit the pH of the water to decrease to a value below 7, and wherein the base is supplied at a level or levels lower than that at which the pH has decreased to the above value.

6 Claims, 2 Drawing Figures

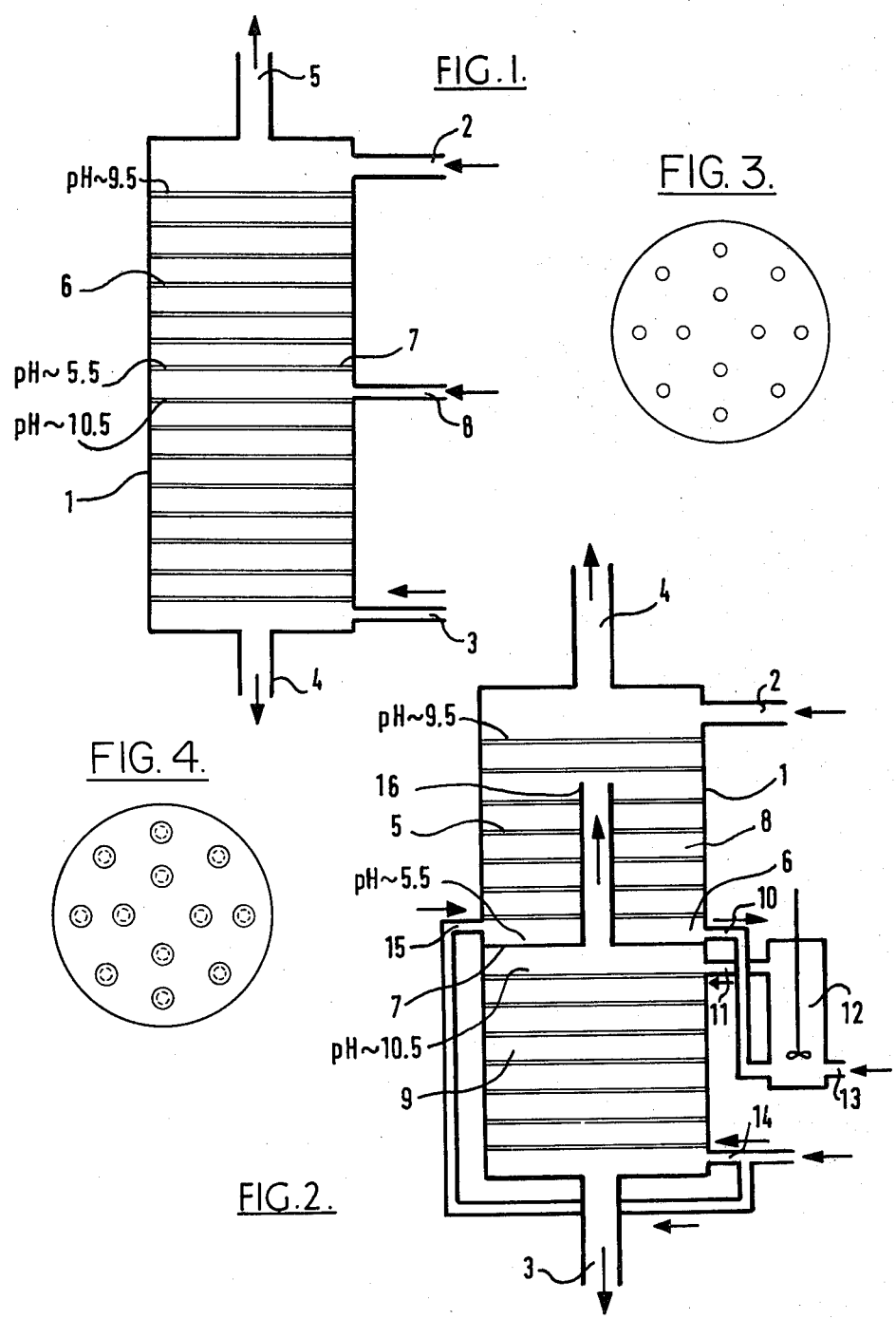

METHOD OF PURIFYING WASTE WATER

This is a continuation of application Ser. No. 081,699, filed Oct. 4, 1979, and now abandoned.

BACKGROUND OF THE INVENTION

1. Field of the Invention

The present invention relates to a method of purifying waste water, in particular waste water from coking plants.

2. Description of the Prior Art

It is known that the most widespread method of purifying the waste water from coking plants is at present to eliminate, in the first instance, the volatile mineral elements ($NH_3$, HCN, $H_2S$, $CO_2$) and a small fraction of the phenolated compounds by distillation or by vapour stripping with a simultaneous lime or sodium treatment to release the ammonia from its stable salts. The residual phenols and the non-volatile elements are then removed from the water by biological oxidation; the ammonia vapour is either destroyed in suitable incinerators with the controlled formation of nitrogen oxides, or treated with sulphuric acid to produce ammonium sulphate.

The importance of this desorption operation within the waste water purification cycle of a coking plant is also known. It this operation is inadequate, the following well-known disadvantages arise:

(a) the overloading of natural basins in which certain inhibiting effects may endanger the efficiency of the treatment;

(b) the requirement for an additional finishing treatment before the water is returned to the natural environment (for example treatment with active carbon);

(c) the risk of atmospheric pollution above the oxidation tanks, as a result of the discharge of the volatile residual matter.

It is therefore to be seen that the desorption operation, whether carried out by distillation or by stripping, must be continued until it is almost completely achieved in order to be considered fully effective.

In order to carry out purification of this type, a method has already been proposed in which a stripping column is used, this column in particular comprising a number of substantially horizontal perforated plates disposed above each other, into the upper portion of which the waste water to be purified is introduced, while vapour is introduced into its lower portion and a strong base is introduced laterally at one or several levels. According to this method, the ammonia salts, whether volatile or non-volatile, are almost completely eliminated from the waste water, whereas other compounds, such as phenols, are eliminated from the water by a biological oxidation process.

SUMMARY OF THE INVENTION

In contrast to the above method, it is an object of the present invention to provide a method of purifying waste water, such as water from coking plants, according to which the water is not only cleared of the ammonium compounds in the stripping column, but is also cleared of at least the major proportion of the phenols and similar compounds.

The method of the present invention is based on the fact, which is known per se, that the possibility of removing phenols from waste water in a stripping column is directly related to the degree of acidity of the water to be treated. The acidity leads, in effect, to a stronger ionization and a stronger hydrolysis, which is favourable to the elimination of the phenols.

The applicants have already proposed a method in which, using a stripping column comprising a number of substantially horizontal perforated plates disposed above each other, the stripping column being fed with the waste water to be purified at its upper portion and with stripping fluid at its lower portion, a strong base is introduced laterally at at least one level of the column into the decomposition zone of the stable ammonium salts, and in which acid such as HCl or $H_2SO_4$ is injected at at least one other level of the column into the phenol elimination zone.

The present invention provides a method of purifying waste water, comprising supplying waste water to be purified to the upper part of a stripping column comprising a plurality of substantially horizontal plates disposed above one another, supplying vapour to the lower part of the column, and supplying a strong base to the column laterally at one or more levels, wherein the water to be stripped is passed downwardly from the top of the column across a number of successive plates sufficient to permit the water to become acidic, that is, with a pH decreasing to a value below 7, and wherein the base is supplied at a level or levels lower than that at which the pH has decreased to the said value.

The method of the invention, which is carried out in a stripping column suitably comprising the usual two zones for eliminating the ammonium compounds, is based on the observation that, during the elimination of the volatile ammonium compounds in the upper zone of the stripping column, the pH of this zone decreases naturally and progressively from the top to the bottom of this zone and that this decrease may continue until the local pH value, in contrast to known methods in which the pH value remains above 7, drops to values lower than 7, and may reach 4. Below a pH value of 7 there is a natural acid zone favorable to the elimination of a considerable proportion of acidic pollutants and in particular phenol constituents (such as carbolic acid, cresols and xylenols), cyanides (such as hydrocyanic acid and sulphocyanides), and carbonates (such as carbonic acid and bicarbonates).

In accordance with the present invention a sufficiently high number of plates, preferably perforated plates, are therefore provided in this upper zone so that the pH decreases progressively to the required acid value. The elimination of the stable ammonium compounds in the lower zone may then be carried out in the normal way, by introducing a base (for example lime or a sodium) base) into the column at a level lower than that at which the pH of the solution has dropped naturally to values corresponding to an acidic nature.

Preferably the ammonia vapours released in the elimination zone of the stable ammonium compounds are conveyed directly into the portion of the upper zone in which the pH of the solution is still basic and preferably such that the content of volatile ammonium compounds of the waste water located there is in equilibrium with the ammonia content of the ammonia vapours provided by the stripping of the stable ammonium compounds. It is possible to ascertain the balance of these contents from the well-known equilibrium curve which gives, at a given pressure, the $NH_3$ contents of the vapours released by ammonia solutions of different $NH_3$ compounds. By knowing the balance of these contents, it is easy to ascertain the plate of the upper zone corresponding to the required content of ammonium compounds and to fix to this plate the outlet of the pipe serving to convey the ammonia vapours coming from the lower zone in which the stable ammonium compounds are stripped.

It is however, appropriate to take into consideration the fuel value of the vapour. From the point of view of a thermal balance, it is in effect advantageous to use the vapours being discharged from the lower zone, on one hand to boil the water entering the column (vapour=heating fluid) and, on the other hand, to strip the pollutants which are volatile and in particular ammonia (vapour=stripping agent). The calculation of the heat exchanges at the plates disposed at the head of the column shows that the percentage of the total amount of calories required to boil the water decreases rapidly downwardly from plate to plate, while the free ammonia content of the water simultaneously decreases rapidly.

In practice, the selection of the upper level of the output of the piping conveying the ammonia vapours coming from the lower zone is often therefore a compromise between the theoretically required level of the content of ammonium compounds to give the required balance and the level at which the cumulative amount of calories transmitted to the water to be stripped at this level and in the entire zone above the level approximates to the total amount required to boil the water and strip the greater proportion of the free ammonia from the waste water introduced at the head of the column.

An increase of the number of plates in the stripping columns used in the method in accordance with the invention is of particular advantage as it permits a substantial decrease in the specific consumption of the vapour as fuel; in this way, the water reflux in the column coming from the dephlegmator which carries out a partial condensation of the ammonia vapours may be considerably reduced and even suppressed, without having any detrimental effects on the adequate operation of the subsequent phase in which these vapours are saturated with $H_2SO_4$ or incinerated. The reduction and suppression of this reflux has, if the total specific consumption of the vapour as fuel remains unchanged, a markedly favourable effect on the elimination rate of the phenols.

The creation of an acid zone also has a particularly advantageous result as it enables lime to be added at a point at which the carbonate ion content of the water is very low, if not zero, and consequently reduces the risk of the stripping column being blocked by $CaCO_3$ deposits.

The phenol elimination may be reinforced by maintaining the temperature of the head of the column, in front of the dephlegmator, at a value of approximatetly 100° C., preferably from 95° C. to 102° C.

The condensed vapour reflux coming from the dephlegmator is preferably reduced or eliminated.

By way of example, in a stripping column containing 24 plates, the following values were obtained, in accordance with the method of the invention, for the contents of the various polluting elements.

| Pollutants (mg/l) | Column Input | Intermediate Stage | Acid Zone Output | Column Output |
|---|---|---|---|---|
| Free $NH_3$ | 2630 | 25–50 | 15–20 | 30–50 |
| Fixed $NH_3$ | 1285 | — | — | 25–50* |
| $S^{--}$ | 460 | 0.3 | Traces | Traces |
| $CN^-$ Free | 100 | 4.15 | 2.6 | 2 |
| $CO_2$ | 13 | 0.4 | Traces | Traces |
| $CO_3^{--}$ | 4160 | Traces | Traces | 45 |
| $HCO_3^-$ | Traces | 50 | 1.5 | Traces |
| Total phenols | 1400 | 420 | 350 | 225 |
| pH | 9.2 | 6.7 | 5.4 | 9.3 |

*10–20% of excess lime

The specific vapour consumption varied between 170 and 210 kg/m³ of water to be treated.

BRIEF DESCRIPTION OF THE DRAWINGS

The invention will be further described, by way of example only, with reference to the accompanying drawings, in which:

FIGS. 1 and 2 are schematic side views of respective embodiments of a stripping column for purifying waste water from coking plants, in which ammonium compounds and phenolated compounds are eliminated.

FIGS. 3 and 4 illustrate top views of perforated and bubble cap plates, respectively, which are conventional in the art and the representations of the shapes, sizes, number and orientation of the peforations and bubble caps, respectively, are for purposes of illustration only and are not to be construed as limiting these features in any manner.

DESCRIPTION OF THE PREFERRED EMBODIMENTS

In the embodiment shown in FIG. 1 a stripping column 1 has an inlet 2 at the head of the column for admitting waste water having a pH value of approximately 9.5, an inlet 3 for introducing stripping vapour, in outlet 4 for discharging stripped water, and an outlet 5 for discharging ammonia vapours. The column 1 contains a number of perforated plates 6. The pH of the water to be stripped decreases progressively downwardly from plate to plate, until it reaches a level at which the pH has a value of for example approximately 5.5. The progressively acidic nature of the water permits a progressive and increasingly considerable elimination of the phenols, for example values of 75% in the zone in which the acidity has a pH of approximately 5.5 (for example at the plate numbered 7).

Below this level, there is an inlet 8 for injection of a base, which increases the pH to a value of for example approximately 10.5 in order to permit the elimination of ammonia from the stable salts.

FIG. 2 shows a stripping column similar to that shown in FIG. 1, but in which the ammonia vapours produced in the lower zone of the column in which the stable ammonium compounds are stripped pass through the acid zone above the lower zone without coming into contact with it and are conveyed directly in the upper part of the column, where stripping of the volatile ammonium compounds is carried out, to the most suitable level of this zone, for example as explained above.

The embodiment shown in FIG. 2 operates as follows. In the column 1, the waste water to be stripped is admitted through the inlet 2 at the head of the column and has a pH value of approximately 9.5. An outlet 3 for discharging stripped water is located at the bottom of the column 1, and an outlet 4 for discharging ammonia vapours is located at the top of the column.

The column 1 is provided with a number of superimposed plates 5. The pH of the water decreases progressively and naturally downwardly from plate to plate, until a value of for example approximately 5.5 is reached, the actual value corresponding to the acidic nature of the water during stripping. The elimination of the phenols is thus made possible at the plate numbered 6 of the column. Below this level, a leak-tight wall 7 divides the column 1 into two parts. The water being stripped is discharged from the upper part 8 into an outlet pipe 10, after its volatile elements and phenols have been removed, and re-enters at the top of the lower part 9 after passing through a tank 12 supplied at 13 with milk of lime, the lime being introduced with the water into the lower part 9 in which the stripping of the stable ammonium compounds may be commenced, at a pH value of approximately 10.5. The stripping vapour is conveyed through an inlet 14 to the base of the lower part 9 and through an inlet 15 to the base of the upper part 8. The ammonia vapours produced in the lower part 9 are conveyed by a conduit 16 through the acid zone (but without coming into contact with it), to a point of a suitable basic nature of the upper part 8.

In the zones in which the phenols or the volatile ammonium compounds are eliminated, plates other than perforated plates may be used, for example bubble cap, the perforated plates then being confined to the zone in which the lime or the basic agent is introduced for stripping the stable ammonium compounds, or to the zone in which the water is stripped after liming.

We claim:

1. In a method of purifying waste water containing volatile and stable ammonium compounds and phenolic compounds in a stripping column comprising an upper part and a lower part, each part including a plurality of substantially horizontal plates disposed above one another, at least some of said plates being perforated plates, said method comprising supplying initially basic waste water to be purified to the top of said upper part, supplying stripping vapor to the bottom of said lower part and supplying a strong base laterally to the column at at least one level, the strong base reacting with the stable ammonium compounds to form ammonia vapors, the improvement comprising additionally supplying stripping vapor to the bottom of said upper part, controlling the flow of waste water downwardly from the top of the bottom of said upper part such that in a region at the bottom of said upper part the waste water becomes acidic without addition of an acid to the stripping column, supplying the strong base to a first zone which is at least one level lower than the acidic region, preventing the ammonia vapors formed in said first zone from contacting the waste water in the acidic region by conveying the ammonia vapors directly to a second zone located in said upper part in which the waste water is still basic and presents a content of volatile ammonia in equilibrium with the ammonia content of the ammonia vapors resulting from the stripping of the stable ammonium compounds located in said first zone.

2. The method according to claim 1, comprising maintaining the temperature at the head of said column at from 95° C. to 102° C.

3. The method according to claim 2, comprising maintaining the temperature at the head of the column at approximately 100° C.

4. The method according to claim 1, comprising supplying the waste water from a coking plant.

5. The method according to claim 1, wherein said plates of the stripping column are all perforated plates.

6. The method according to claim 1, wherein the plates of the stripping column that are not perforated are bubble cap plates.

* * * * *

UNITED STATES PATENT AND TRADEMARK OFFICE
CERTIFICATE OF CORRECTION

PATENT NO. : 4,396,463
DATED : August 2, 1983
INVENTOR(S) : Christian Josis et al.

It is certified that error appears in the above-identified patent and that said Letters Patent is hereby corrected as shown below:

On the title page item /73/ should read

--[73] Assignee: Centre de Recherches Metallurgiques-
Centrum voor Research in de Metallurgies,
Brussels, Belgium; and, Sidmar, Maritieme
Staalnijverheid N.V., Siderurgie Maritime S. A.;
Gent, Belgium--

Signed and Sealed this

Tenth Day of April 1984

[SEAL]

Attest:

GERALD J. MOSSINGHOFF

Attesting Officer

Commissioner of Patents and Trademarks